Jan. 29, 1924.
G. A. LYON
BUFFER ATTACHING DEVICE
Original Filed March 31, 1921
1,481,963
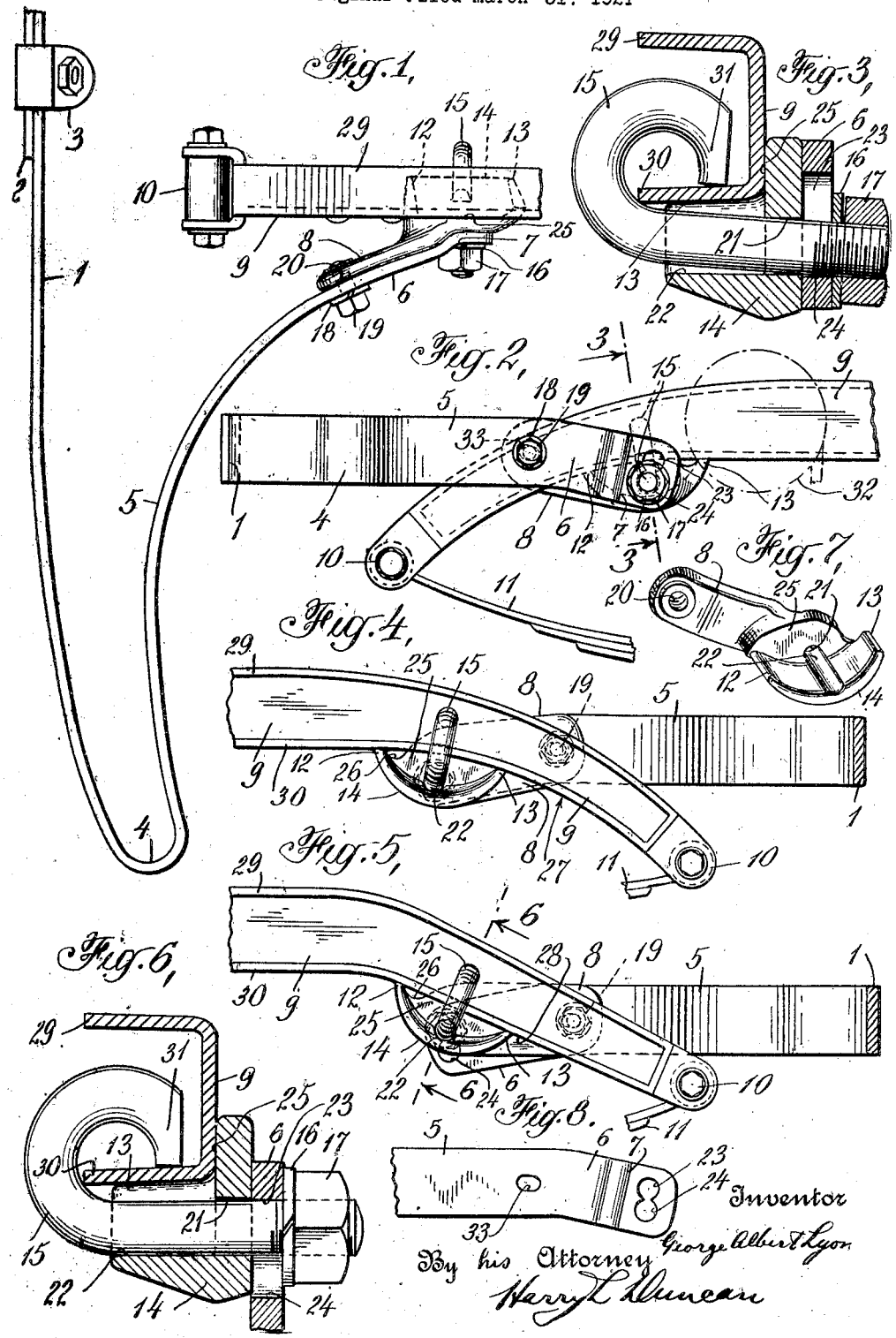
Inventor
George Albert Lyon
By his Attorney
Harry L. Duncan Patented Jan. 29, 1924.

1,481,963

UNITED STATES PATENT OFFICE.

GEORGE ALBERT LYON, OF PHILADELPHIA, PENNSYLVANIA.

BUFFER-ATTACHING DEVICE.

Application filed March 31, 1921, Serial No. 457,258. Renewed April 30, 1923.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Buffer-Attaching Devices, of which the following is a specification, taken in connection with the accompanying drawing, which forms part of the same.

This invention relates especially to attaching devices for securing various types of buffers or bumpers to automobiles or other vehicles and in which attaching brackets preferably having outwardly flaring bracket arms, may be permanently connected or bolted to the attaching members of the buffer, while a hook bolt passing through the end of the attaching member and bracket may securely connect the two, and attach them to the frame flange around which the bolt end may wedgingly engage as described in the Lyon Patent No. 1,266,836 of May 21, 1918. The attacher bracket which may be conveniently made by drop forging processes or by casting, may comprise two separated supporting members or flanges extending laterally from the bearing face of the bracket which is arranged to engage the web of the cooperating frame member of the automobile, so that these members in connection with the hook bolt securely connect the end of the buffer attaching member to the frame and if desired may also lock the attaching member in its desired adjusted position with respect to the attacher bracket. For this purpose the end of the attaching member may be provided with a slot or other adjusting aperture such as 2 or 3 intersecting figure 8 holes, so that when the stem of the hook bolt is passed through any one of these intersecting holes it definitely locks the attacher end in this adjusted position, and strongly supports the same in addition to the firm connection which may be secured by a connecting bolt passing through a forward portion of the attaching member and having a threaded engagement with the front of the bracket arm for instance. This connecting bolt may permanently connect the bracket arm and attaching member, so that they cannot become disconnected during shipment and yet by slightly loosening this bolt the desired angular adjustment may be made between the rear end of the attaching member and the bracket.

In the accompanying drawing showing in a somewhat diagrammatic way illustrative embodiments or arrangements of this invention.

Fig. 1 is a plan view.

Fig. 2 is a corresponding side elevation; and

Fig. 3 is an enlarged transverse section taken substantially along the line 3—3 of Fig. 2.

Fig. 4 is a side elevation showing the inner side of this frame member and connected parts.

Fig. 5 is a corresponding view showing another form of frame member.

Fig. 6 is an enlarged transverse section thereof, taken along the line 6—6 of Fig. 5.

Fig. 7 is a perspective view of the attacher bracket; and

Fig. 8 is a detail view showing the end of the attaching member.

The automobile or vehicle buffer or bumper may be of any suitable or desired construction and preferably comprises a buffer front of spring steel strips 1 and 2, which may be advantageously connected by clamping members such as 3, and loops 4 may be arranged at each end of the buffer and connected in any suitable way with the attaching members 5 which may be of tempered spring steel strip, adapted to be connected to and supported by the attacher brackets engaging the frames on each side of the automobile. As shown in Figs. 1, 3 and 7 these attacher brackets which may be formed of drop forged steel or other suitable metal may comprise a bearing face 25 adapted to engage the web of the automobile frame member while the transversely extending supporting members or flanges 12, 13 are adapted to engage the lower flange of the frame at points sufficiently separated to give a secure and rigid connection for the buffer. The bracket is formed with a hole 21 for the stem of the hook bolt 15 which preferably has sufficient clearance to allow the hook bolt to assume a slightly angular position when applying it to the frame as is shown in Fig. 3, and if desired the lower portion 14 of this bracket may in some cases be formed with an aligning hook bolt socket or groove 22 in which the hook bolt sufficiently engages to promote its desired transverse position. In many cases it is desirable to have the arm 8 of the attacher bracket flare or diverge outwardly away from the frame web 9, so as to clear the bolt heads or other projections which frequently occur thereon and this bracket arm may advantageously be formed with a threaded connecting hole 20 to accommodate the connecting bolt 19, extending through a slot or preferably close fitting hole several inches ahead of the hook bolt in this end portion 6 of the attaching buffer, a lock washer 18 being interposed below this bolt head if desired. This flaring arrangement of the attacher bracket and end of the attaching member is desirable to clear the mud guards or other parts which are frequently arranged on the frames of later type automobiles and a drop forged type of attacher bracket gives a strong and reliable connection under these conditions.

The hook bolt 15 which may have a trimmed hook end 3 which as shown in Fig. 3 is preferably formed of special strong or alloy steel suitably tempered or heat treated to give a high degree of strength and stiffness and with curved frame members such as shown in Figs. 2 and 4 where the lower flange 9 has a curved lower surface 27, the stem of the hook bolt may assume a somewhat inclined or angular position at least when first applied to the frame flange 30, as is shown in Fig. 3. The projecting end of this hook bolt stem may pass through any one of the two or more intersecting holes 23, 24, forming a figure 8 adjustment and aligning aperture as shown in Fig. 8 of the drawing, and when the tightening nut 17 and if desired the locking washer 16 are then applied to the bolt stem and tightened, all of these parts are drawn up tightly against the frame web and flange and the wedging action of the hook bolt against the corner of the frame flange tends to force or spring the hook bolt stem into straighter position and hold the attacher bracket and buffer end still tightly against the frame. By providing two or more such intersecting adjusting holes in the end of the attaching members of the buffer a considerable range of angular adjustment can be secured so that the buffer front may extend out substantially horizontally as shown in Figs. 2 and 4, and of course the closer adjustment of this angular position can be effected by moving the attacher brackets along the curved frame flange to secure a considerable extent of angular adjustment.

If however, the frame end is of the straight type shown in Fig. 5, the shank of the hook bolt 15 is not carried upward to such an extent as indicated in Fig. 3 and can assume a more nearly straight or horizontal position as is indicated in Fig. 6. Ample tightness of connection is however secured by this arrangement and the angular position of the buffer can be adjusted throughout a considerable angle by inserting the stem of the hook bolt through the desired one of the intersecting holes 23, 24 of which any desired number may be used to form an adjusting aligning aperture of the type shown in Fig. 8. As is shown this rear adjusting aperture may be formed in the offset end 7 of the attaching member which is preferably bent into position parallel with the frame web as is shown in Fig. 1. If desired also the forward connection hole 33 may in some cases be slightly elongated as shown in Fig. 8 so as to give a greater degree of clearance and compensate amply for any slight lack of alignment between the holes in the attacher bracket. It is of course desirable to have this front connecting hole in the attaching members of the buffer small and narrow, so as to reduce the strength of the strip just as little as possible at this point for which reason it is much better to have the adjusting aperture or slot further back along the attaching members. As already explained this attaching device has a very considerable range of adjustment and fits practically all of the present automobile frames, even when they are equipped with shock absorbers or snubbers such as 32 shown in dotted lines in Fig. 2. Furthermore in some cases where the automobile frame end is especially shaped or positioned, a further range of adjustment can be secured by turning the attaching members 5 upside down after disconnecting them from the attacher brackets, so that the adjusting apertures in the attaching members are engaged in reversed position by the brackets and hook bolts as is readily apparent. It is of course understood that these attaching devices may be used in some cases for securing other attachments or auxiliary devices to the front or rear ends of automobile frame members and that the invention is not therefore to be strictly limited to automobile buffers.

This invention has been described in connection with a number of embodiments, forms, proportions, parts arrangements, materials, methods of connection and use, to the details of which disclosure the invention is not of course to be limited, since what is claimed as new and what is desired to be secured by Letters Patent is set forth in the appended claims:

1. In attaching devices adapted for use in attaching an automobile buffer to automobile frame members having projecting flanges, a buffer attaching member of spring steel strip having an inwardly bent portion and an offset end to form a substantially flat bearing portion provided with a plurality of intersecting adjusting holes forming a figure 8 type adjusting aperture, said attaching member being formed with a connecting hole ahead of said aperture, a forged attacher bracket having a bearing face adapted to engage the web of the automobile frame member and having laterally extending supporting flanges projecting from said bearing face at longitudinally separated points and adapted to engage the frame flange there being a hook bolt hole formed in said bearing face and an aligning hook bolt socket formed in said bracket between said supporting flanges, an outwardly diverging bracket arm formed on said bracket to substantially engage and support the adjacent attaching member and formed with a threaded connecting hole, a connecting member extending through said connecting holes to permanently and adjustably connect said bracket arm and attaching member and a hook bolt adapted to adjustably and securely connect said bracket and attaching member to the cooperating automobile frame member.

2. In attaching devices adapted for use in attaching an automobile buffer to automobile frame members having projecting flanges, a buffer attaching member having an inwardly bent portion and a substantially flat bearing portion provided with an adjusting aperture, said attaching member being formed with a connecting hole ahead of said aperture, a forged attacher bracket having a bearing face adapted to engage the web of the automobile frame member and having laterally extending supporting flanges projecting from said bearing face at longitudinally separated points and adapted to engage the frame flange there being a hook bolt hole formed in said bearing face, an outwardly diverging bracket arm formed on said bracket to substantially engage and support the adjacent attaching member and formed with a connecting hole, a connecting member extending through said connecting holes to permanently and adjustably connect said bracket arm and attaching member and a hook bolt adapted to adjustably and securely connect said bracket and attaching member to the cooperating automobile frame member.

3. In attaching devices adapted for use in attaching an automobile buffer to automobile frame members having projecting flanges, a buffer attaching member having an inwardly bent substantially flat bearing portion provided with an adjusting aperture, an attacher bracket having a bearing portion adapted to engage the web of the automobile frame member and having laterally extending supporting members projecting at longitudinally separated points and adapted to engage the frame flange there being a hook bolt hole formed in said bearing portion, an outwardly diverging bracket arm formed on said bracket pivotally connected to the adjacent attaching member and a hook bolt adapted to adjustably and securely connect said bracket and attaching member together and to the cooperating automobile frame member.

4. In attaching devices adapted for use in attaching an automobile buffer to automobile frame members having projecting flanges, a buffer attaching member having an inwardly bent bearing portion provided with an adjusting aperture, an attacher bracket having a bearing portion adapted to engage the web of the automobile frame member and having laterally extending supporting members projecting at longitudinally separated points and adapted to engage the frame flange, an outwardly diverging bracket arm formed on said bracket connected to the adjacent attaching member and a hook bolt adapted to adjustably and securely connect said bracket and attaching member together and to the cooperating automobile frame member.

5. In attaching devices adapted for use in attaching an automobile buffer or the like to automobile frame members having projecting flanges, a buffer attaching member having a substantially flat connecting portion provided with a plurality of intersecting adjusting holes forming a figure 8 type adjusting aperture, said attaching member being formed with a connecting hole ahead of said aperture, a forged attacher bracket having a bearing portion adapted to engage the web of the automobile frame member and having laterally extending supporting members at longitudinally separated points and adapted to engage the frame flange, an outwardly diverging bracket arm formed on said bracket to support the adjacent attaching member and formed with a threaded connecting hole, a connecting bolt extending through said connecting holes to adjustably connect said bracket arm and attaching member and a hook bolt adapted to pass through said hook bolt hole and adjusting aperture adjustably and securely connect said bracket and attaching member to the cooperating automobile frame member.

6. In attaching devices adapted for use in attaching an automobile buffer or the like to automobile frame members having projecting flanges, a buffer attaching member having a connecting portion provided with an adjusting aperture, said attaching member being formed with a connecting hole ahead of said aperture, an attacher bracket having a bearing portion adapted to engage the web of the automobile frame member and having laterally extending supporting members at longitudinally separated points and adapted to engage the frame flange, a forwardly extending bracket arm formed on said bracket to support the adjacent attaching member and formed with a connecting hole, a connecting bolt extending through said connecting holes to adjustably connect said bracket arm and attaching member and a hook bolt adapted to pass through said hook bolt hole and adjusting aperture adjustably and securely connect said bracket and attaching member to the cooperating automobile frame member.

7. In attaching devices adapted for use in attaching an automobile buffer or the like to automobile frame members having projecting flanges, a buffer attaching member of steel strip having an inwardly bent bearing portion provided with an aperture, said attaching member being formed with a connecting hole ahead of said aperture, an attacher bracket having bearing portions adapted to engage the web and flange of the automobile frame member at longitudinally separated points there being a hook bolt hole formed in said bearing portions, an outwardly diverging bracket arm formed on said bracket to support the adjacent attaching member and formed with a connecting hole, a connecting device cooperating with said connecting holes to adjustably connect said bracket arm and attaching member and a hook bolt adapted to pass through and connect said bracket and attaching member and secure them to the automobile frame member.

8. In attaching devices adapted for use in attaching an automobile buffer or the like to automobile frame members having projecting flanges, a buffer attaching member having an inwardly bent bearing portion, said attaching member being formed with a connecting hole ahead of said aperture, an attacher bracket having bearing portions adapted to engage the web and flange of the automobile frame member, an outwardly diverging bracket arm formed on said bracket to support the adjacent attaching member and formed with a connecting hole, a connecting device cooperating with said connecting holes to adjustably connect said bracket arm and attaching member and a hook bolt adapted to adjustably connect said bracket and attaching member and secure them to the automobile frame member.

9. In attaching devices adapted for use in attaching an automobile buffer or the like to automobile frame members having projecting flanges, an attaching member having an end bearing portion, an attacher bracket having bearing portions adapted to engage the web and flange of the automobile frame member, a forwardly extending bracket arm formed on said bracket and loosely connected to the adjacent attaching member ahead of its bearing portion and a hook bolt to adjustably and securely connect said bracket and the bearing end of said attaching member together and to the automobile front member.

GEORGE ALBERT LYON.